United States Patent [19]

Finch et al.

[11] 3,716,575
[45] Feb. 13, 1973

[54] PURIFICATION OF BIS(2-HYDROXYETHYL)TEREPHTHALATE

[75] Inventors: Ray N. Finch; John P. Mireur; Hollye Fouts, all of Corpus Christi, Tex.

[73] Assignee: Celanese Corporation, New York, N.Y.

[22] Filed: Feb. 16, 1971

[21] Appl. No.: 115,859

Related U.S. Application Data

[63] Continuation of Ser. No. 713,273, March 8, 1968, abandoned.

[52] U.S. Cl............................................260/475 PR
[51] Int. Cl..............................................C07c 69/82
[58] Field of Search..............................260/475 PR

[56] References Cited

UNITED STATES PATENTS 3,239,556    3/1966    Slockett.........................260/475 P

*Primary Examiner*—Lorraine A. Weinberger
*Assistant Examiner*—E. Jane Skelly
*Attorney*—Marvin Turken

[57] ABSTRACT

A process for the removal of color forming impurities, such as aldehydes and nitrogen compounds, from bis(2-hydroxyethyl terephthalate by treatment with mixtures of an alkali metal sulfite and an alkali metal bisulfite.

6 Claims, No Drawings

PURIFICATION OF BIS(2-HYDROXYETHYL)TEREPHTHALATE

This application is a continuation of Ser. No. 713,273. filed Mar. 8, 1968, now abandoned.

BACKGROUND OF THE INVENTION

In recent years the production of linear super polyesters of polyethylene terephthalate has become of significant commercial interest. These polyesters may be produced by a variety of methods one of which is the polymerization of bis(2-hydroxyethyl) terephthalate. A number of methods have been reported in the literature for the production of the terephthalate such as by the reaction of terephthalic acid with either ethylene glycol or ethylene oxide, and by the reaction of salts of terephthalic acid with ethylene chlorohydrin. Almost all of the processes are satisfactory for the production of bis(2-hydroxyethyl) terephthalate, but they do not produce a product which is free of color forming impurities, such as aldehydes and nitrogen compounds, unless the terephthalic acid starting material itself is free of these color forming impurities. Although all of the color forming impurities found in the terephthalate have not yet been identified, the hydroxyethyl ester of carboxybenzaldehyde is one of the most troublesome and the amount of this impurity is generally used as a criterion of effectiveness in a purification process. Of course the specification for a fiber grade terephthalate varies according to the end use of the polyester, but many uses require less than about 50 ppm and sometimes less than 25 ppm of the hydroxyethyl ester of carboxybenzaldehyde.

Because of these stringent purity requirements for bis(2-hydroxyethyl) terephthalate there have been many methods devised for the purification of this product. For example, U. S. Pat. No. 3,239,556 describes a method for removing color forming impurities from aqueous solutions of the terephthalate by adding at least 2 percent by weight of a bisulfite or a sulfite treating agent prior to crystallizing the terephthalate. Another means of purification that has been disclosed in the literature is the reduction of impurities in aqueous solutions with gaseous hydrogen in the presence of platinum, palladium, rhodium, etc. as disclosed in French Patent No. 1,479,925. Also British Patent No. 760,027 discloses a method for the purification of aqueous solutions of bis(2-hydroxyethyl) terephthalate by treatment with sodium hyposulfite.

SUMMARY

It is thus an object of the present invention to provide a process for the purification of bis(2-hydroxyethyl) terephthalate. More particularly, it is an object of the present invention to provide a process for the purification of bis(2-hydroxyethyl) terephthalate so as to reduce the amount of color forming impurities found in the terephthalate. Additional objects will become apparent from the following description of the present invention.

These and other objects are accomplished by the present invention which in one of its embodiments is a process for the reduction of color forming impurities in crude bis(2-hydroxyethyl) terephthalate comprising (a) contacting at a temperature of between 65° and 105°C an aqueous solution of crude bis(2-hydroxyethyl) terephthalate having a pH of less than about 5.5 with at least 0.01 percent by weight of a mixture having from about 25 to 55 weight percent of an alkali metal bisulfite and from about 45 to 75 weight percent of an alkali metal sulfite, the amount of said mixture being sufficient to raise the pH of the aqueous terephthalate solution to between about 5.8 and 7.2; (b) cooling said solution so as to crystallize the bis(2-hydroxyethyl) terephthalate therefrom and (c) recovering the thus crystallized bis(2-hydroxyethyl) terephthalate containing less color forming impurities than said crude bis(2hydroxyethyl) terephthalate.

By alkali metal is meant those monovalent metals in Group I-A of the Periodic Table and including sodium, lithium, potassium, rubidium and cesium. Thus the various sulfites and bisulfites which may be utilized include sodium sulfite, lithium sulfite, potassium sulfite, rubidium sulfite, cesium sulfite, potassium bisulfite, sodium bisulfite, rubidium bisulfite, lithium bisulfite and cesium bisulfite. Sodium sulfite and sodium bisulfite are preferred over the others.

DESCRIPTION OF THE PREFERRED EMBODIMENTS

As was pointed out above, the purification of aqueous solutions of bis(2-hydroxyethyl) terephthalate by the use of an alkali metal bisulfite or an alkali metal sulfite has been reported in the literature. However, the present invention which utilizes a mixture of specific ratios of bisulfite to sulfite offers a number of advantages over the process using the sulfite or the bisulfite alone, one of the most important advantages being pH control. It has been found that the pH of the aqueous terephthalate solution must be maintained at a pH of from about 5.8 to 7.2 and preferably about 6.5 during the period of time in which the bisulfite or sulfite treating agent is in contact with the aqueous terephthalate solution. That is, the pH must be within this range after the treating agent has been added. This is necessary because operation at a pH outside this range will usually result in severe corrosion of process equipment and/or hydrolysis losses of the terephthalate product. The pH of an aqueous solution of crude BHET produced by the above mentioned methods will generally have a pH of less than about 5.5 and usually will have a pH of around 4.3. When such solutions of crude diester are treated with an alkali metal sulfite alone, it has been found that adequate purification cannot be obtained without undue hydrolysis losses. Likewise, in the absence of going through the additional step of adding caustic to the system, the use of an alkali metal bisulfite alone results in severe corrosion problems, losses through hydrolysis and also does not provide adequate reduction of impurities. In contrast to the situation where the bisulfite or the sulfite is used alone, the use of a mixture in accordance with the present invention will produce a product of satisfactory purity without the unwanted hydrolysis losses, corrosion problems or necessity to carefully regulate the pH of the system by caustic addition.

The mixture of alkali metal bisulfite and alkali metal sulfite to be used in the present invention may vary so as to contain from about 25–55 weight percent of the bisulfite and from about 75–45 weight percent of the sulfite. The ratio of the bisulfite to the sulfite in a mixture will generally depend on the pH of the aqueous diester solution to which the mixture is to be added. The lower the pH, the lower the percentage of bisulfite in the mixture should be and vice versa. For most solutions of crude bis(2-hydroxyethyl) terephthalate, mixtures containing from 35 to 45 percent bisulfite and 55–65 percent sulfite will be adequate. The amount of the bisulfite-sulfite mixture to be added should generally be at least 0.01 percent by weight and usually less than 2 percent by weight based on the weight of the diester will be needed. In most cases from about 0.05 to 1.5 percent by weight will be sufficient. The aqueous terephthalate solutions to be treated in accordance with the present invention may be of varying concentrations although it will generally be desirable to treat solutions containing at least 5 percent by weight of the terephthalate, e.g., 5–40 percent.

The contacting of the alkali metal sulfite-bisulfite mixture with the aqueous solution of the diester should generally be within the temperature range of 55°–120 °C although the process is operative outside this range. The adjustment of the temperature of the solution may be made either before or after the contact is made although the temperature of the solution of crude diester is preferably within the desired temperature range before the sulfite-bisulfite mixture is added. The most preferable range of temperatures for performing the present process is a range of about 80°–90°C. After the sulfite-bisulfite mixture has been in contact with the aqueous terephthalate solution for the desired period of time, the solution is then cooled immediately to below 40°C, preferably to below 30°C in order to crystallize the bis(2-hydroxyethyl) terephthalate from solution. The thus crystallized, purified terephthalate can then be removed by convenient means such as filtration. If desired the thus recovered purified terephthalate may be further treated for the removal of any residual amounts of color forming impurities such as by washing, treatment with activated charcoal, and the like. Preferably the crystals are recovered by filtration and a water wash so as to remove any water-soluble impurities remaining in the crystals.

The contact time required in the present process may vary from about 1 to 20 minutes but should not be extended too much longer because longer residence times cause decay of the bisulfite ion adduct formation with the color forming impurities. Preferably the contact time is from about 2-10 minutes especially when the preferred temperature range of 80°–90°C is used. In order to illustrate the present invention the following ecamples are given. Unless otherwise specified all the percentages are weight percent.

EXAMPLE I

In a continuous process, an aqueous solution of crude bis(2-hydroxyethyl) terephthalate having a pH of about 4.1 was treated at a temperature of about 90°C by continuously adding to the solution with mixing a mixture of about 60 percent sodium sulfite and 40 percent sodium bisulfite. The amount of bisulfite-sulfite mixture added was sufficient to provide about 1.0 percent based on the weight of the crude diester and the pH of the aqueous solution after addition of the mixture was about 6.5. After a period of about 10 minutes, the aqueous diester solution was passed to a crystallizer maintained at a temperature of about 25°C and 22 mmHga so as to crystallize the terephthalate from solution. The crystallized bis(2-hydroxyethyl) terephthalate was then removed by filtration, washed with water and dried. As determined by the colormetric total aldehyde method the original crude diester contained about 2,500 ppm of aldehyde impurities comprised mainly of the hydroxyethyl of carboxybenzaldehyde while the white, purified product contained only about 25 ppm of aldehyde. The loss of diester products through hydrolysis was determined to be less than 0.1 percent.

EXAMPLE II

Repeating the procedure of Example I utilizing sodium sulfite alone causes the pH of the diester solution to be raised to the tolerable range of about 5.8 to 7.2 after adding about 0.3 percent sodium sulfite, and reduces the aldehyde content of the bis(2-hydroxyethyl) terephthalate to only about 52 ppm. Adding enough sodium sulfite so as to reduce the aldehyde content of the diester product to that obtained in Example I causes the pH of the solution to be raised to about 8.0 causing losses of bis(2-hydroxyethyl) terephthalate due to hydrolysis of about 1 percent.

EXAMPLE III

Repeating the procedure of Example I using varying amounts of sodium bisulfite alone up to about 2 percent based on the weight of diester fails to raise the pH to above about 5.2 and results in the aldehyde content of the product being reduced to only about 200 ppm. Also at this pH severe corrosion of the Type 316 stainless steel equipment occurs and losses of the product through hydrolysis are about 3 percent.

We claim:

1. A process for the reduction of color forming impurities in crude bis(2-hydroxyethyl) terephthalate containing aldehyde or nitrogen impurities comprising
   a. contacting at a temperature of between 65° and 105° C an aqueous solution of said crude bis (2-hydroxyethyl) terephthalate having a pH of less than about 5.5 with about 0.05 to 1.5 percent by weight based on the weight of the terephthalate of a mixture having from about 25 to 55 weight percent of an alkali metal bisulfite and from about 45 to 75 weight percent of an alkali metal sulfite, the amount of said mixture being sufficient to raise the pH of the aqueous terephthalate solution to between about 5.8 and 7.2;
   b. cooling said solution so as to crystallize the bis(2-hydroxyethyl) terephthalate therefrom and
   c. recovering the thus crystallized bis (2-hydroxyethyl) terephthalate.

2. The process of claim 1 wherein said contacting is for a period of from about 1 to 20 minutes.

3. The process of claim 1 wherein said contacting is for a period of from about 2 to 10 minutes.

4. The process of claim 1 wherein said mixture contains from about 35 to 45 percent by weight of the bisulfite and from about 55 to 65 percent by weight of the sulfite.

5. The process of claim 1 wherein the alkali metal sulfite is sodium sulfite and the alkali metal bisulfite is sodium bisulfite.

6. The process of claim 1 wherein the contact time is from about 3 to 10 minutes and wherein the crystallized bis(2-hydroxyethyl) terephthalate is recovered by filtration with a water wash.

* * * * *